United States Patent

[11] 3,604,947

[72] Inventor Steven H. Puthuff
San Diego, Calif.

[21] Appl. No. 843,900
[22] Filed June 24, 1969
[45] Patented Sept. 14, 1971
[73] Assignee Aerojet-General Corporation
El Monte, Calif.
Continuation-in-part of application Ser. No. 661,093, Aug. 16, 1967, which is a continuation-in-part of application Ser. No. 504,032, Oct. 23, 1965, now abandoned.

[54] VARIABLE FILTER DEVICE
6 Claims, 25 Drawing Figs.

[52] U.S. Cl. .................... 307/233, 307/251, 307/295, 307/223, 328/167, 332/31 T, 332/45, 333/70 CR
[51] Int. Cl. .................... H03k 5/20
[50] Field of Search .................... 332/45, 43 B, 16 T, 31 T; 307/246, 232, 233, 295, 223, 251, 304; 328/151, 167; 333/70 R, 70 CR

[56] References Cited

UNITED STATES PATENTS

| | | | |
|---|---|---|---|
| 3,225,214 | 12/1965 | Burley .................... | 307/232 |
| 3,243,731 | 3/1966 | Erickson .................... | 332/45 X |
| 3,253,161 | 5/1966 | Owen .................... | 307/251 X |
| 3,343,130 | 9/1967 | Petschauer et al. .................... | 307/246 X |
| 3,344,262 | 9/1967 | Pryor .................... | 328/151 X |

OTHER REFERENCES

Field Effect Transistors No. 2, Jun., 1962 pp. 1 to 6 Amelco Semiconductor Div. of Teledyne P. O. Box #1030 Mountain View California 307-304

Rogers " Reduction of Impulse Noise by Interruption of Signal Flow Using a Field Effect Transistor" R.C.A. Technical Notes #640 Aug., 1965 307-251

*Primary Examiner*—Alfred L. Brody
*Attorneys*—Edward O. Ansell and D. Gordon Angus

ABSTRACT: The present invention relates to electrical circuit apparatus capable of providing sampled integration of an electric signal.

According to the present invention, an integrator filter is provided having at least one capacitor stage. Each stage includes a capacitor in series with an electronic switch, such as a field-effect transistor capable of being switched at a desired frequency.

INVENTOR.
STEVEN H. PUTHUFF
BY D. Gordon Angus
ATTORNEY.

INVENTOR.
STEVEN H. PUTHUFF
BY D. Gordon Angus
ATTORNEY.

INVENTOR.
STEVEN H. PUTHUFF
BY O. Gordon Angus
ATTORNEY.

INVENTOR
STEVEN H. PUTHUFF
BY D. Gordon Angus
ATTORNEY.

VARIABLE FILTER DEVICE

This application is a continuation-in-part of my copending application, Ser. No. 661,093, filed Aug. 16, 1967 which in turn is a continuation-in-part of my copending application, Ser. No. 504,032, filed Oct. 23, 1965 and now abandoned.

The present invention relates generally to electrical circuit apparatus, and more particularly to such apparatus for providing sampled integration of an electric signal.

In a variety of electronic equipment, a necessary function is the selective sampling of a signal and integrating the same over a prescribed smalltime interval. For example, a band-pass can be provided in this manner by utilizing a number of stages of sampled integration that operated sequentially in time on a varying input voltage, which may be direct and/or alternating. It is particularly in this context that the invention will be described.

To achieve sampling at high rates required for electronic and solid state processing equipment, and equally fast-acting switching means is required. A satisfactory electronic switching means must also have a very high impedance when in the "open" condition; as well as provide a suitable "closed" circuit path when so switched. Field-effect transistors in a special circuit arrangement are the preferred elements for the electronic switching means.

It is an object of the invention to provide circuit apparatus for performing selective sampling and integration.

It is another object of the invention to provide a band-pass filter by successive multiple sampled integrations of an input signal.

Another object of this invention is to provide a circuit for producing balanced modulation of a signal through selective integration thereof.

Another object is the provision of apparatus as in the foregoing objects in which field-effect transistors are utilized to accomplish switching and integration.

Yet another object is the provision of such circuit apparatus for measuring phase relationship of electronic switches.

It is a still further object of this invention to provide a variety of band-pass, band rejection and high- and low-pass filter devices of novel configuration and wide utility.

Another object of the present invention is to provide a single sideband generator utilizing an integrator filter for selection of bands.

Another object of the present invention is to provide a transfer function analyzer for determining the transfer characteristics of a signal.

Another object of the present invention is to provide a spectrum analyzer for determining the frequency components of an input signal.

Another object of the invention is to provide field-effect transistor circuit means capable of performing a variety of functions requiring frequency discrimination and operation on discrete frequency ranges.

These and many other objects of the invention will be more fully understood from the specification which follows wherein a number of embodiments of the invention are described and illustrated in the figures of the drawings. These embodiments are representative of the types of devices which may be achieved by employing the teachings of the invention within the scope of the appended claims. Other embodiments may occur to those skilled in the art appertaining hereto and accordingly the illustrative embodiments shown and described herein should not be construed as limiting the invention thereto.

According to the present invention, circuit apparatus is provided having an input circuit for supplying a signal to be integrated. At least one capacitor stage is provided having a storage capacitor and an electronic switching means connected in series. The electronic switching means, which may for example be a field-effect transistor, has a relatively high and a relatively low resistance state. Means connects the capacitor of each capacitor stage to the input circuit, and another means connects the capacitor of each capacitor stage to an output circuit. A source of control signals is provided for alternately and successively switching the switching means between its high and low resistance states.

The circuit apparatus is useful as a basic circuit for electronic applications where signal integration is utilized. As will be more fully explained hereinafter, by varying the number of capacitor stages, the apparatus forms the basic circuit for band-pass filters, notch filters, modulators, single sideband generators, phase meters, and spectrum analyzers, as well as a variety of other uses.

The above and other features of this invention will be more fully understood from the following detailed description and the accompanying drawings, in which.

Figure 4:
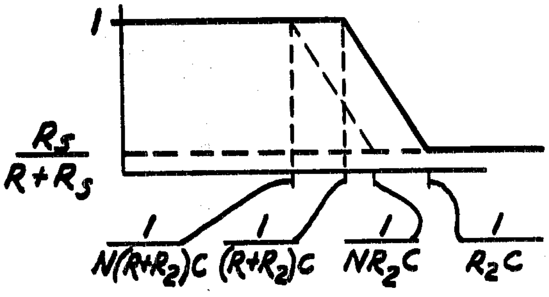
Figure 6:
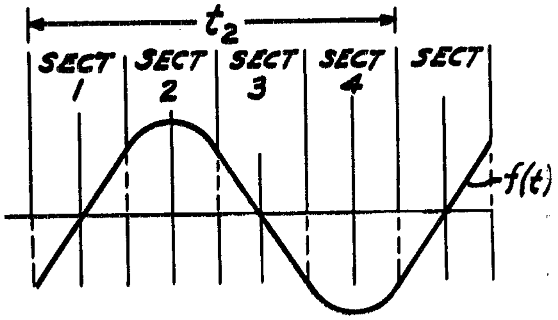
Figure 5:
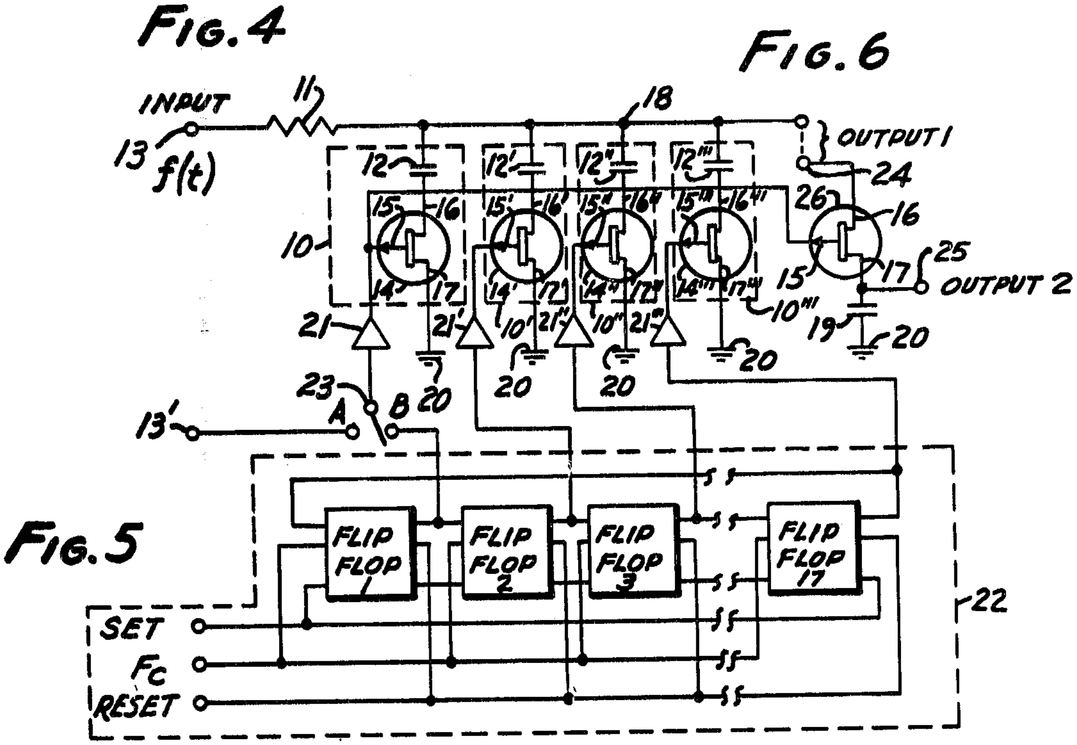
Figure 7:
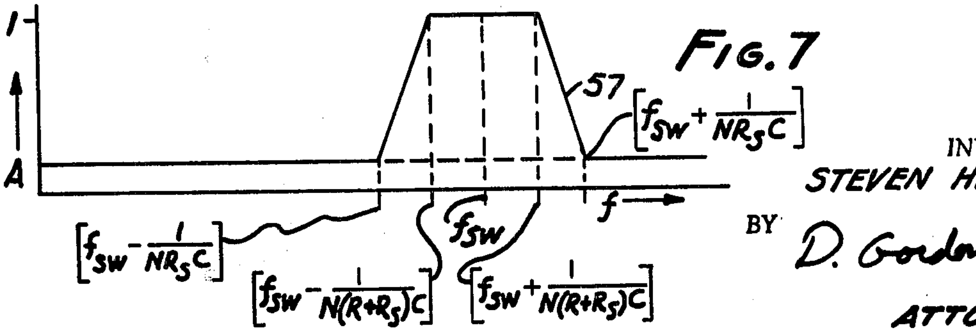
Figure 8:
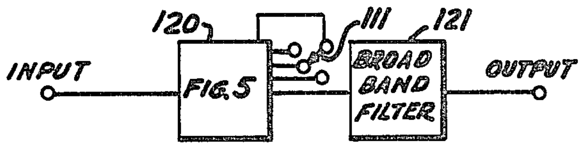
Figure 9:
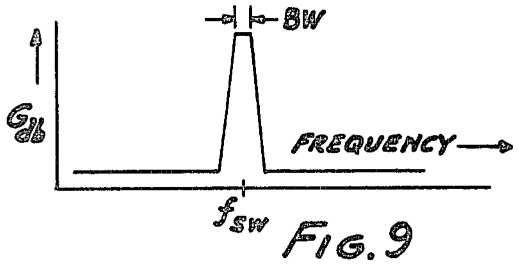
Figure 10:
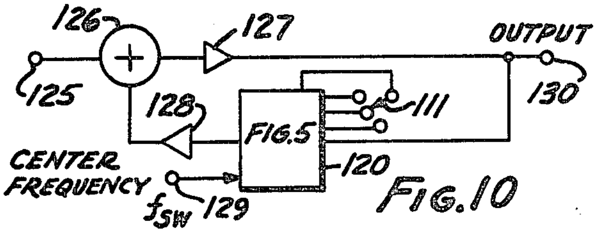
Figure 11:
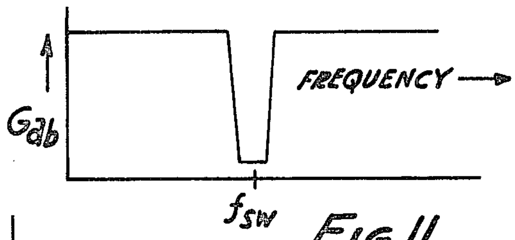
Figure 12:
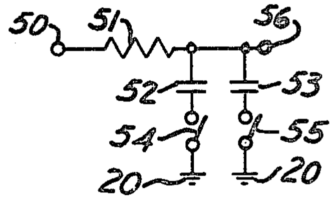
Figure 13:
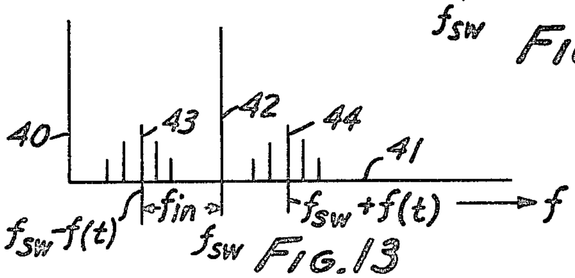
Figure 14:
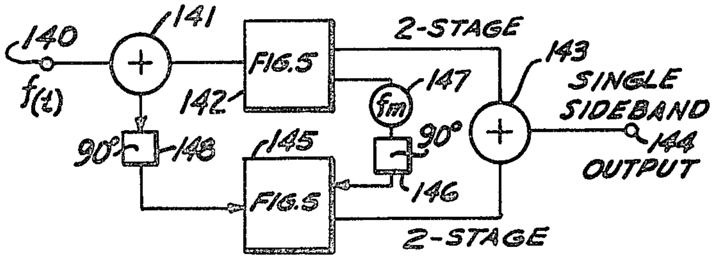
Figures 15, 16:
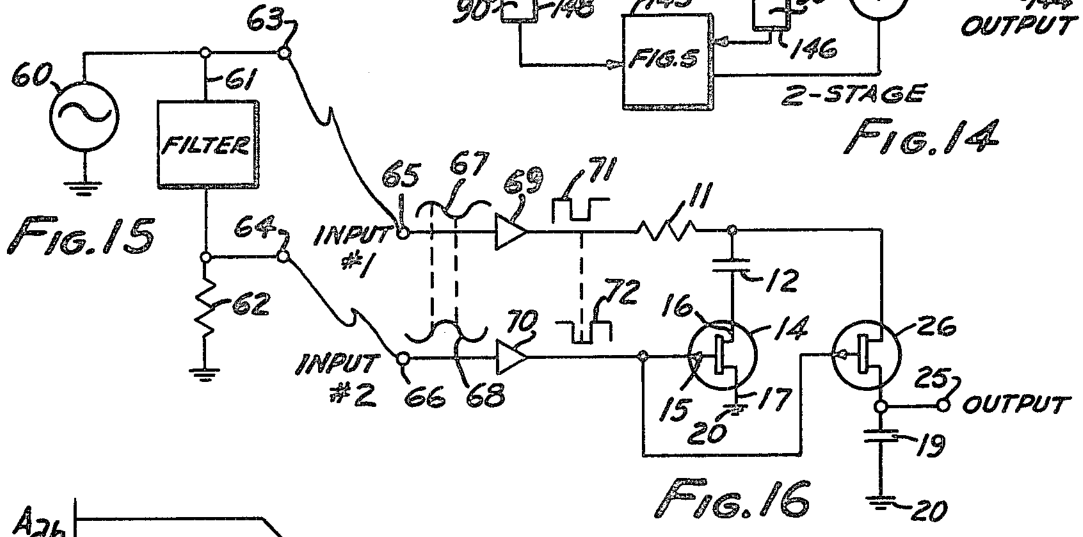
Figure 20:
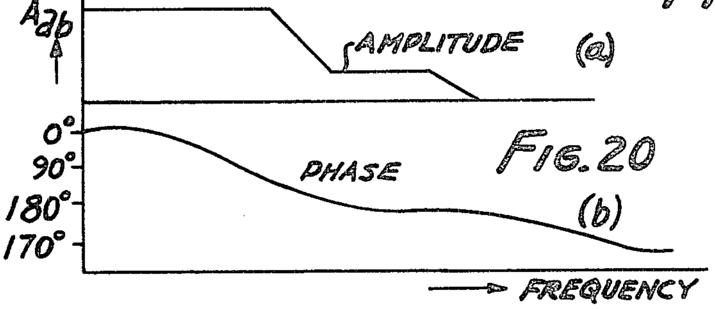
Figure 17:
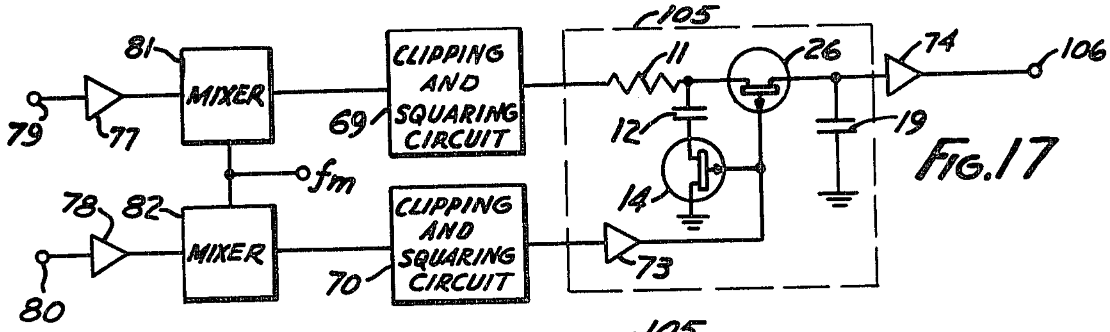
Figure 18:
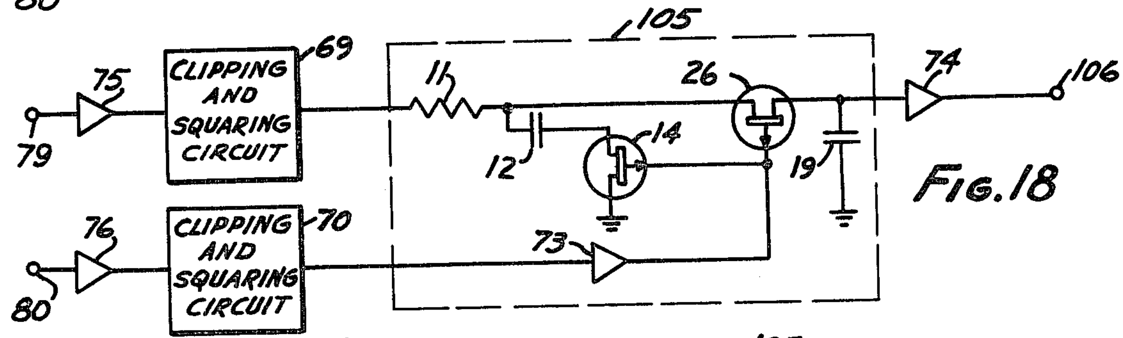
Figures 19, 21:
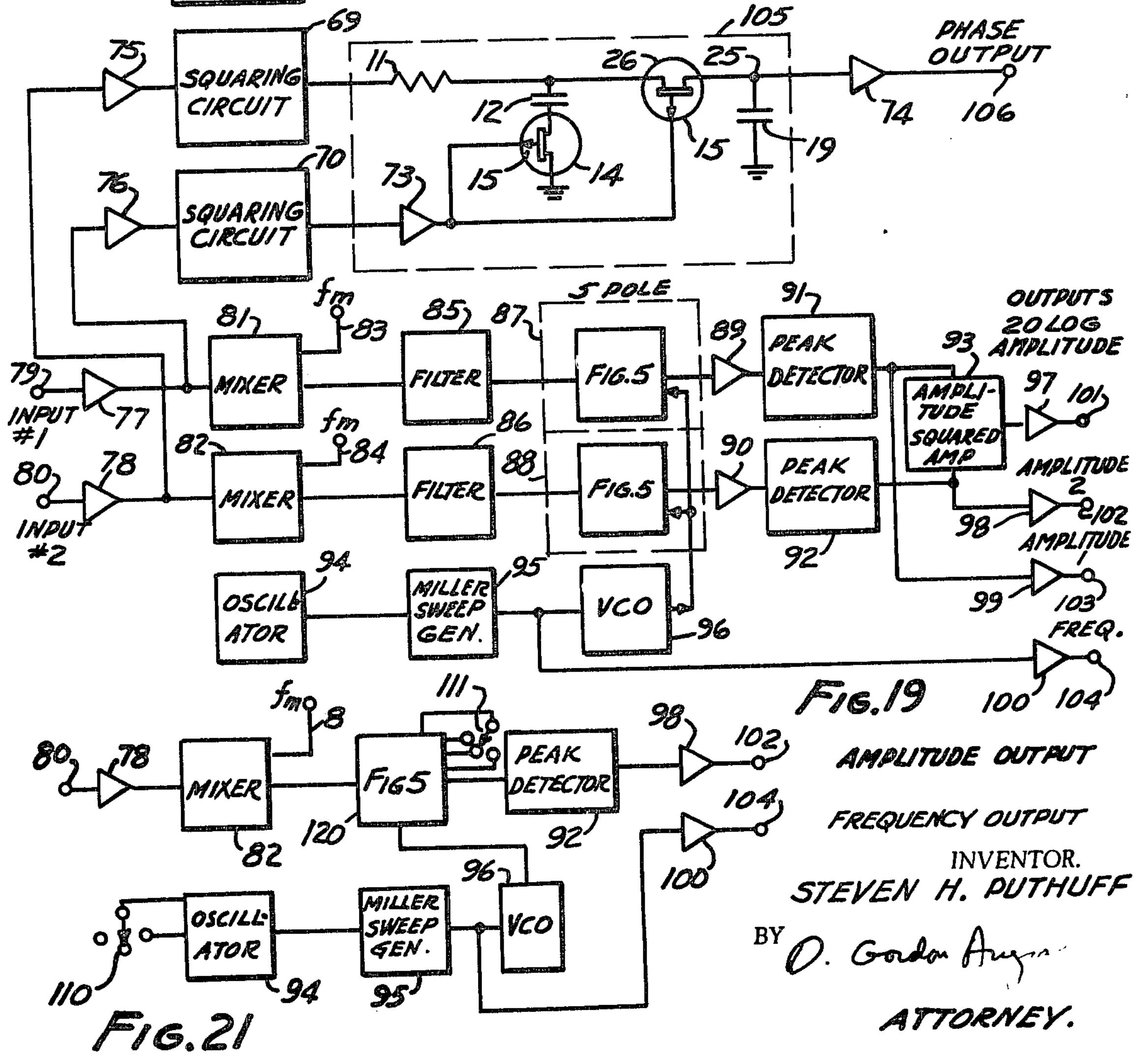
Figure 22:
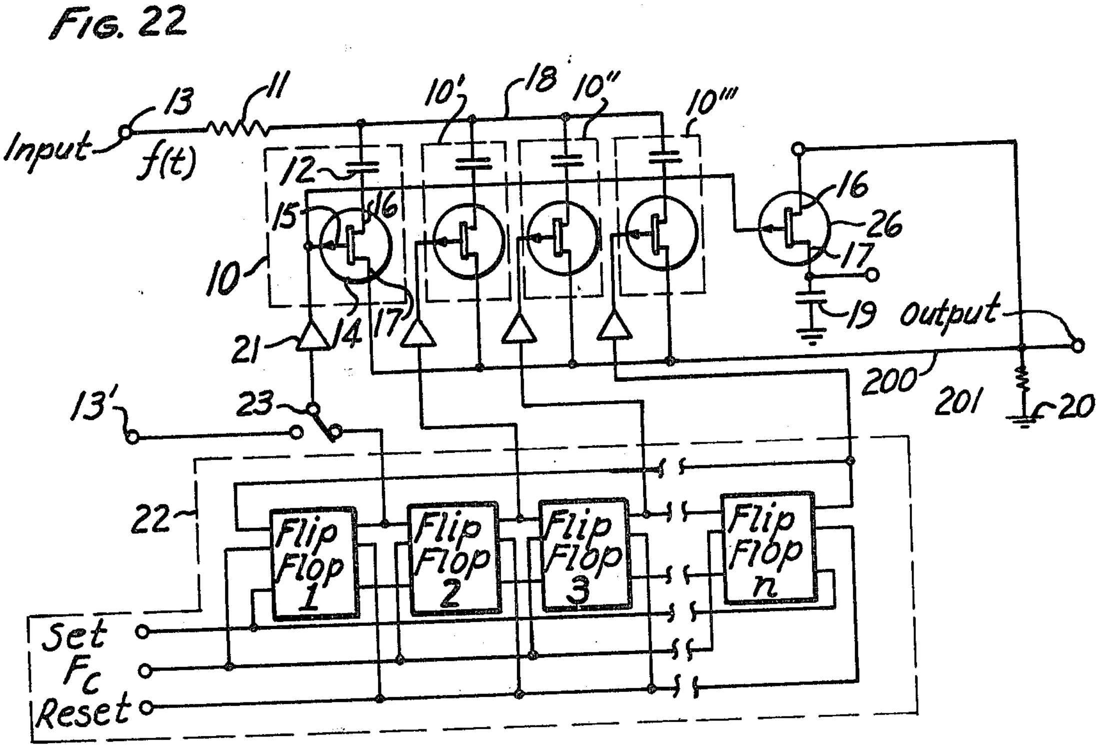
Figure 23:
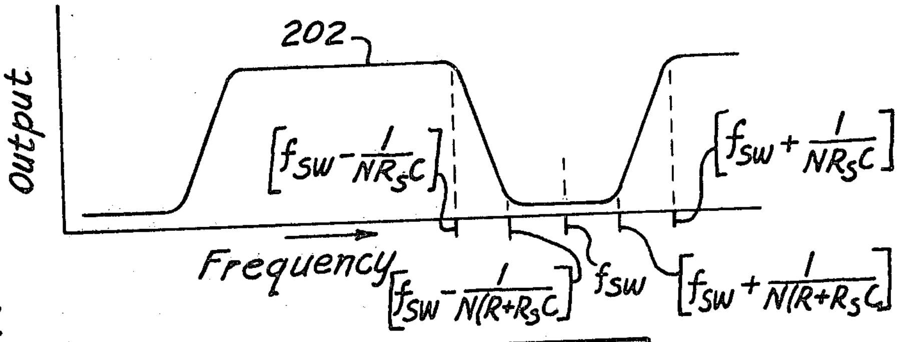
Figure 24:
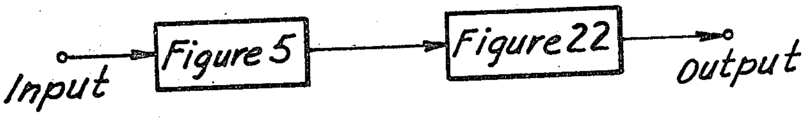
Figure 25:
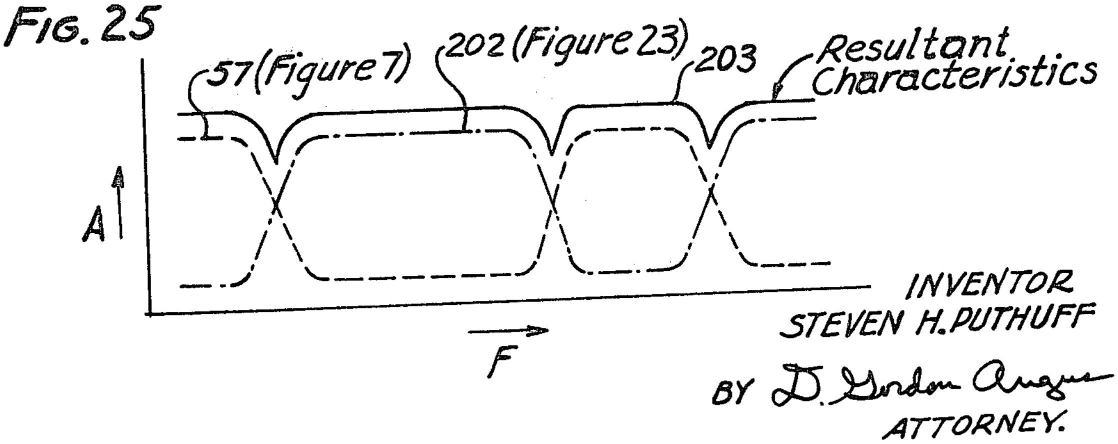

FIG. 4 details in graphic form an operative function of the invention;

FIG. 5 is a partially schematic and partially block diagram of the presently preferred embodiment of a sampling integrator circuit employing the principles of the invention;

FIG. 6 is a graph of a multiple stage charging characteristic;

FIG. 7 is a graph of a band-pass characteristic of a multiple stage operation;

FIG. 8 is a block diagram of a band-pass filter utilizing the principles of the present invention;

FIG. 9 is a graph of operating characteristics of the circuit of FIG. 8;

FIG. 10 is a circuit block diagram of a notch filter of selectable bandwidth utilizing the principles of the present invention;

FIG. 11 is a graph of operating characteristics of the circuit of FIG. 10;

FIG. 12 is an explanatory circuit diagram detailing an operating principle of a modulator according to the invention;

FIG. 13 details in graph form the output of an amplitude modulator producing a carrier signal with sidebands;

FIG. 14 is a block diagram of an implementation of the invention as a single sideband signal generator;

FIG. 15 is a schematic block diagram of a filter circuit;

FIG. 16 is a partially block and partially schematic diagram of a circuit according to the present invention for use in phase measurements;

FIG. 17 is a block and schematic circuit diagram of a modification of the phase meter illustrated in FIG. 16;

FIG. 18 is a schematic circuit and block diagram of another modification of the phase-measuring circuit illustrated in FIG. 16;

FIG. 19 is a schematic and block diagram of a circuit for determining transfer function analysis;

FIG. 20 is a graph of the characteristics of the operation of the circuit of FIG. 19;

FIG. 21 is a block diagram of a circuit for use as a spectrum analyzer;

FIG. 22 is a partially schematic and partially block diagram of another embodiment of a sampling integrator circuit employing the principles of the present invention;

FIG. 23 is a graph of the band-pass characteristics of a multiple stage operation of the circuit illustrated in FIG. 22;

FIG. 24 is a schematic diagram of a notch filter employing the sampling integrator circuit shown in FIGS. 5 and 22; and FIG. 25 is a graph of the characteristics of operation of the circuit shown in FIG. 24.

Figure 1:
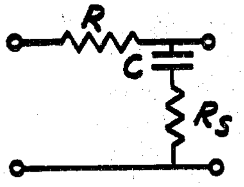
FIG. 1 is a circuit diagram illustrative of the principle of operation of a basic element of the invention.
Figure 2:
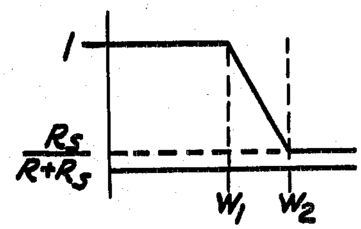
FIG. 2 is a graph relating to operation of the circuit of FIG. 1.

The resistor-capacitor network shown in the circuit of FIG. 1 and the graph of FIG. 2 are presented to explain the basic theory of operation of an RC integrator circuit which is a basic unit in modified form used throughout the different embodiments of the invention.

The resistance-capacitance (RC) circuit (FIG. 1) acts as an integrating circuit with a bandwidth equal to $1/2w\text{RC}$, and the time constant of the circuit is given by the expression $t=(R+R_s)$.

The wave form plotted in FIG. 2 shows frequency response in terms of frequency, $W$, on the abscissa, and the gain as the ordinate. It is essentially the graph of the transfer function of the RC network in FIG. 1. For the ratio of input voltage $e_{in}$ to output voltage of the network, the transfer function can be expressed mathematically as:

$$\frac{e_o}{e_{in}}=\frac{R_s+\frac{1}{jwc}}{R+R_s+\frac{1}{jws}}=\frac{1+jwR_sC}{1+jwC(R+R_s)}.$$

The transfer function will have a pole at $W_1=1/(R+R_s)C$ and a zero at $W_2=1/R_sC$, as shown in FIG. 2. The numeral 1 on the ordinate indicates the ideal case, or no attenuation.

As will be presented in detail later, a fundamental unit of the invention is an integrator circuit as in FIG. 1 where a field-effect transistor is substituted for the resistance $R_s$.

Figure 3:
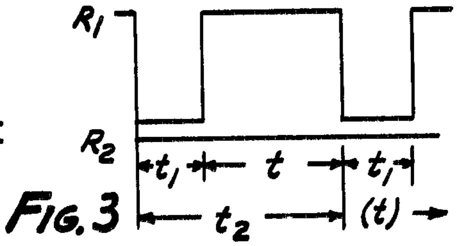
FIG. 3 is a graphical representation of time variation achieved for the circuit of FIG. 1 when Rs in FIG. 1 is functionally provided by a field-effect transistor.

Considering $R_s$ as the dynamic source resistance (DSR) of the field-effect transistor (FET) which can be varied with respect to time ($t$) between a pair of values of resistance $R_1$ and $R_2$, the graph of FIG. 3 is plotted to show the variation of resistance of the FET between $R_1$ and $R_2$ over a time cycle $t_2$. This variation in resistance of the FET causes a change in current through the FET, and hence, the charging current of the capacitor C in the circuit of FIG. 1 varies in relation to $R_1$ and $R_2$. A controlling circuit will allow the DSR of the FET to assume the time variations plotted in FIG. 3, where time ($t$) is the abscissa and impedance is the ordinate.

Where $R_1>>R_2, \leq 100\Omega$, $R_1>1$ megohm, the duty cycle $D=t_1/t_2$, and assuming $N=1/D$, then the time constant of the resistance cycle is;

$$T^2=(R_2+R)CN+\frac{(R+R_1)}{N-1}CN.$$

If $R_1>>R_2$, it can be shown that $T_2=NR_tC$, where $R_t=R+R_2$.

Referring to FIG. 1 and assuming $R_s$ to be a fixed resistor, the pole frequency, that is, the frequency at which the filter rolloff begins, may be determined by calculating the time constant of the filter circuit, which is $(R+R_s)C$. *Thus, the pole frequency, which is inverse to the time constant of the circuit, is* $1/(R+\alpha R_2)C$. The zero frequency, that is, the frequency at which the attenuation first reaches a minimum, is that frequency at which the attenuation occurs in the shunt portion of the filter and can be shown to be $1/R_sC$. By using a field-effect transistor having its resistance varying between $R_1$ and $R_2$ for resistor $R_s$, and operating it as described in relation to FIG. 3, new pole and zero frequencies of $1/N(R+R_2)C$ and $1/NR_2C$, respectively, are obtained. Since the value of $R_2$ is very small, the pole frequency may be approximated as $1/NRC$. Therefore, with a field-effect transistor substituted for $R_s$, the pole and zero frequencies are modified by the factor $N$, thereby providing a rolloff for the filter at any desired pole frequency as determined by the selection of the value of $N$. This is illustrated in FIG. 4. The term "rolloff" as used herein means the frequency at which the cutoff characteristics of the filter begins. It is determined by, and identical to, the pole frequency of the filter (or one of the pole frequencies if more than one pole frequency exists).

A circuit representative of the more generalized aspects of this invention is shown in FIG. 5. This circuit is a basic integrator circuit for use as a phase detector, a variable bandwidth filter, a notch filter, a modulator, a single sideband generator and/or detector, a phase meter, a transfer function analyzer, and a spectrum analyzer, as well as many other applications, depending upon the manner in which the basic integrator circuit is modified. A plurality of capacitor stages 10, 10', 10'', 10''', are connected in common to one end 18 of an input resistance 11, the other end of which is connected to an input terminal 13 and to which a source of signals $f(t)$ is applied. The input signals can be a varying voltage that may be direct and/or alternating.

Within each capacitor stage 10 there is included a storage capacitor 12 connected between the drain electrode 16 of a field-effect transistor 14 and the common line 18, the source electrode 17 of the field-effect transistor being connected to ground 20. Gate electrode 15 of each field-effect transistor is connected to the output line of respective amplifiers 21, 21', etc. The term "storage capacitor" as used herein means a capacitor capable of storing a voltage therein. The term "capacitor stage" as used herein means a subcircuit having a storage capacitor and an electronic switching means capable of assuming a relatively high and a relatively low resistance state. The term "electrical switching means" as used herein means a switching means which is switched between a relatively high and a relatively low resistance state by the application of an electrical signal to it. By way of example, a suitable electronic switching means applicable to the present invention is a field-effect transistor having relatively high and low resistance states of about 1 megohm and 100 ohms, respectively.

The input lines of amplifiers 21, 21' etc. are connected to a ring counter 22 shown generally as the equipment included in the dashed block and which comprises a plurality of flip-flop units 1, 2, 3,...$n$, interconnected in conventional ring counter arrangement. A ring counter, sometimes known in the art as a frequency divider, is a circuit which utilizes a plurality of bistable switching circuits, such as flip-flops, arranged so that each successive switching circuit is conditioned by the switching circuit before it, and the last switching circuit conditions the first one. Successive clock pulses to the ring counter operated on the switching circuits sequentially so that switching circuits sequentially pass a signal.

A single-pole double-throw switch 23 is provided to selectively connect amplifier 21 to either flip-flop 1 of the ring counter or to terminal 13' so as to permit selection of either of two inputs thereto for a purpose that will be made clear later. However, for purposes of explanation it will be assumed that switch 23 connects flip-flop 1 to amplifier 21 as shown. The terms "control signal" and "switching signal" may be used interchangeably herein, and mean the signal which controls the rate of switching of the FETs. The control signal for the FETs is provided by the ring counter when switch 23 is in the position B, shown in FIG. 5. When switch 23 is moved to position A, an external control signal (or switching signal) may be supplied through terminal 13'. A flip-flop is a term applied to a known class of bistable devices that have two stable states and when impulsed to one state ("set", for example) it will stay in that state until it is affirmatively impulsed ("reset" line) to change to the other state. The mutual electrical arrangement of the $n$ flip-flops is such that when flip-flop 1 is impulsed to change states, a corresponding change will "ripple" through the entire set of flip-flops. This action provides successive gating signals to the gate electrodes 15, 15',...

Ring counter 22 is conditioned by placing a pulse on the "set" line so as to condition flip-flop 1 to an "on" or 1 condition. The clock pulse signal appearing at line $F_o$ drive the successive flip-flops in such a manner that the output from each flip-flop will be a pulse frequency of $F_o/N$, $N$ being the number of flip-flops in the ring counter, and also the factor by which the pole frequency of the filter rolloff is shifted. Thus, the ring counter acts as a frequency divider and each output signal is phase shifted from the other output signals by $1/N$ cycles. Furthermore, the duration or duty cycle ($D$) of each pulse signal is $1/N$ cycles. Thus, $D=1/N$. It can therefore be appreciated that the output pulses from the successive flip-flops occur one at a time in sequence so that a pulse always appears on one of the lines.

By way of example, if six flip-flops are used in the ring counter 22, and the clock pulse frequency is 6 kc., and each output signal is shifted from the others by 1/6 cycle, or 60°. Furthermore, each output signal has a pulse duration of 1/6 cycle, or 60°, so that one of the FETs is conditioned to its low impedance, or $R_2$ state, while all others are at a high impedance, or $R_1$ state.

An output field-effect transistor (FET) 26 is provided with its drain electrode 16 forming an output 1, as at 24, with common line 18. Source electrode 17 of FET 26 has an output charge storage capacitor 19 connected between it and ground 20, the source electrode also serving as a second output terminal 25 as measured with respect to ground. The gate electrode 15 of FET 26 is connected directly to the output of amplifier 21 and in common with the gate electrode of FET 14 in capacitor stage 10.

BAND-PASS FILTER

With three or more stages of the system operates as a band-pass filter having a center frequency equal to the frequency of the output signals form each stage of ring counter 22 (*fsw*). Each capacitor stage integrates the input signal $f(t)$ over a different portion, and the cumulative effect is to filter the waveform for a certain bandwidth. For minimum insertion loss, each capacitor stage integrates over the same portion of the input waveform during each cycle. This is accomplished by setting the switching frequency ($f_sw$) generated by ring counter 22 identical to the input frequency $f(t)$ applied at input 13. Assuming there are four flip-flops in ring counter 22, with an input frequency to the ring counter of $F_c$, the switching frequency ($f_{sw}$) to each capacitor stage 10–10''' is $F_c/4$ Furthermore, due to the sequential operation of the flip-flops and thus the sequential operation of the FETs in the capacitor stages, each FET is permitted to pass current for ¼ cycle.

Referring to FIG. 6, and assuming that the frequency of $f(t)$ equals the frequency of the outputs from the ring counter ($f_{sw}$, or $F_c/4$ in the example), the field-effect transistor of each capacitor stage is switched on (or to the $R_1$ state) during the same quarter cycle of each cycle.

During the first quarter cycle of $f(t)$, that is, between −45° and +45° in the example, FET 14 in the first capacitor stage 10 is switched to its low impedance stage, and capacitor 12 is charged to the average voltage of input signal $f(t)$ appearing on line 18, which in this case is zero. During the second quarter cycle of $f(t)$; (between +45° and +135°), capacitor 12' in the second stage 10' is charged to the average voltage of signal $f(t)$, which in this case is about +0.835 $f(t)_{max}$. During the third quarter cycle (between +135° and +225°), capacitor 10'' in the third stage is charged to zero, and during the fourth quarter cycle, (between +225° and +315° [−45°]), capacitor 12''' in the fourth stage charges to about −0.853 $f(t)_{max}$.

During the fifth quarter cycle, between −45° and +45°, the input signal, which averages zero volts, "sees" open circuits in stages two, three and four, due to the high impedance of the respective FETS, and further "sees" a capacitor charged to the same averaged voltage (namely, zero volts) in the first stage. Therefore, no change in charge occurs on capacitor 12 in the first stage, and the fifth quarter cycle passes to output 1 at 24. (Actually, capacitor 12 will initially discharge to a negative voltage due to the initial presence of a negative signal $f(t)$. This produces a pulse output at 24, which, during the first quarter cycle, is zero volts. The pulse output may later be filtered and shaped back to a sine wave). Likewise, during the sixth quarter cycle, between +45° and +135°, the input signal, which averages +0.853 $f(t)_{max}$ volts, "sees" open circuits in stages one, three and four and a capacitor charged to the same average voltage (+0.853 $f(t)_{max}$ volts) in the second stage. Therefore, the output voltage during the sixth quarter cycle averages +0.853 $f(t)_{max}$ volts. This continues on through the remainder of each cycle of $f(t)$ so that the output signal is at the same frequency and amplitude as the input. Actually, an insertion loss occurs due to the small amount of charging and discharging of the capacitors during each quarter cycle. However, as the number of stages increases, the amount of change of charge becomes smaller due to the smaller portion of the waveform operated on by each, so that insertion losses decrease and approach zero as the number of sections gets very large.

By way of example, where four stages are employed, the amplitude of one charged capacitor is mathematically represented, for the condition where $f_{in}=f_{sw}$, by the expression $$e_{av}=\frac{2}{\pi}\int_{\frac{\pi}{4}}^{\frac{3}{4}\pi} e_{in}\sin x dx=\frac{2\sqrt{2}}{\pi}e_{in}$$

$$e_{fund}=\frac{2}{\pi}\int_{\frac{\pi}{2}}^{\frac{3}{2}\pi}\frac{2\sqrt{2}}{\pi}e_{in}\sin x dx$$

$$e_{fund}=\frac{8}{\pi^2}e_{in}$$

therefore, $$\frac{e_{fund}}{e_{in}}=\frac{8}{\pi^2}=\frac{8}{9.8696}=.81.$$

Or expressed slightly differently, the insertion loss then equals 1.8 *db*. As the number of stages is further increased the average charge on each capacitor of the different stages approaches the true amplitude of the input signal. Thus, the insertion loss decreases and approaches zero as the number of sections gets very large.

FIG. 7 represents the band-pass characteristics of the circuit illustrated in FIG. 5 operated as a band-pass filter. Recalling that the filter rolloff frequency may be modified by the factor $N$ (the number of flip-flops in ringer counter 22), the bandwidth of band 57 is $2/NR_tC$ where $R_t=R+R_s$, and has a center frequency at $f_{sw}$. Since $N$ represents the number of flip-flops, it will always be an integer greater than 1, and in the case of a band-pass filter, will be 3 or more. Therefore, as the number of flip-flops increases, the bandwidth of the filter and the insertion losses both become smaller.

FIG. 8 illustrates a block diagram showing an integrator filter circuit 120, which is the circuit shown in FIG. 5, having a bandwidth selection switch 111. Switch 111 is connected to the capacitor stages 10 and to ring counter 22 of FIG. 5 in such a manner as to select the number of capacitor stages and flip-flops which may be included in the filter circuit. Thus, the bandwidth of the filter circuit may be selected by selectively varying $N$. A broadband filter 121 is provided at the output of the band-pass filter 120 to shape the waveform to a sine wave as hereinbefore explained. FIG. 9 is a graph illustrating the band-pass characteristics of the filter illustrated in FIG. 8.

NOTCH FILTER

The block diagram of FIG. 10 illustrates a notch filter having a selectable bandwidth. The term "notch filter" as used herein means a filter capable of rejecting or not passing, signals having frequencies within any desired bandwidth. It is often called a "band rejection filter." The input signal $f(t)$ is applied to the circuit at 125 and forms one input to summing circuit 126. The output of the summing circuit is fed through inverter amplifier 127 and back through a band-pass filter 120, which is the circuit illustrated in FIG. 5. A bandwidth selection switch 111 may be connected to filter 120 in the manner described in connection with FIG. 8. The output of filter 120 is applied through isolation amplifier 128 to the other input of summing circuit 126.

In operation of the notch filter, the input signal $f(t)$ is permitted to pass directly from the input at 125 to the output at 130, but signals at band-pass frequency, passed by the filter 120, are subtracted at the summing circuit so that all frequencies are passed except those at the band-pass frequencies of filter 120. The characteristics of the notch filter are illustrated in the graph of FIG. 11 wherein the frequency is plotted against the grain of the circuit.

MODULATOR

When only two capacitor sections 10, 10' are used, the circuit of FIG. 5 functions as a balanced modulator. The switching signal $f_{sw}$ of the FETS is the carrier signal, and is amplitude modulated by the input signal $f(t)$. This circuit is symbolically illustrated in FIG. 12 wherein capacitors 52 and 53 represent the capacitor stages 10 and 10' and switches 54 and 55 represent FETs 14 and 14'. The switching rate of each switch is at carrier frequency $f_{sw}$ and each is 180° out of phase from the other switch. Thus, one capacitor is in circuit for one-half the carrier cycle while the other capacitor is in circuit for the other one-half carrier cycle.

As explained above in regard to the band-pass filter, if the input frequency $f(t)$ equals the switching frequency $f_{SW'}$ each capacitor in the successive capacitor stages charges to a level equal to the average value of the input signal $f(t)$ during the time that the capacitor is in circuit. Thus, if the two signals $f(t)$ and $f_{sw}$ have identical frequencies, the phase shift between them remains constant. But if the frequency of one of the signals changes, the phase shift between the two signals continuously changes. For example, if the frequency of $f(t)$ is 1,000 c.p.s., and the frequency of $f_{sw}$ is 1,001 c.p.s., there is a continuously changing phase shift between them. The phase shift between a signal at 1,000 c.p.s. and another signal at 1,0001 c.p.s. goes through a complete 360° cycle once every second, so a frequency difference of 1 c.p.s. exists between $f_{sw}$ and $f(t)$.

The principle of operation of the balanced modulator according to the present invention can readily be understood by applying the above principles to the simplified circuit diagram illustrated in FIG. 12. If switches 54 and 55 are switched on and off 1,001 times per second, and an input frequency $f(t)$ is applied at 1,000 c.p.s., the charge on capacitors 52 and 53 continuously changes at a frequency equal to the difference of $f(t)$ and $f_{sw}$, which in this case is 1 c.p.s. This is due to the changing phase shift between the two signals due to their difference. Thus, the output of the balanced modulator, which is dependent upon the change of capacitor charge on the capacitors, assumes the characteristics of the switching signal $f_{sw}$, amplitude modulated by the signal of the input $f(t)$.

FIG. 13 is a graph wherein ordinate 40 is signal amplitude and abscissa 41 is frequency. This graph illustrates the output signal from the balanced modulator. The carrier signal $f_{sw}$ is graphically illustrated at 42 and the sideband modulating signals appear at $f_{sw} \pm f(t)$, illustrated at 43 and 44.

SINGLE SIDEBAND GENERATOR

The circuit of FIG. 14 illustrates the application of the present invention as a single sideband generator. This circuit is based upon the use of a pair of modulators as described above driven by the same input and switching frequencies, but one of the modulators being 90° out of phase with the other. In FIG. 14 there is illustrated a pair of two-stage digital sampling integrator-filter units 142 and 145 to which modulating signal $f(t)$ is applied at input 140. The signal $f(t)$ is divided into two components by element 141, one component being applied to integrator-filter unit 142 and the other component being passed through 90° phase shifter 148 to integrator-filter unit 145. Integrator-filter circuits and 145 are two-stage filter circuits as shown in FIG. 5. A source 147 of carrier signal $f_{sw}$ is introduced into integrator-filter unit 142 and also through 90° phase shifter 146 to integrator-filter 145. The output of integrator-filter 142 is applied to one input of summing device 143, and the output of integrator-filter 145 is applied to the other input of summing device 143. The output of summing device 143 provides the output 144 of the single sideband generator.

It is a conventional technique, often referred to as a phase shift or phase discrimination method, to utilize two balanced modulators, one 90° out of phase with the other, to create a single sideband generator. The lower sidebands of a balanced modulator differ from the upper sidebands by the sign of the phase shift. A double sideband generator, or balanced modulator, generates an output signal have + and − deviations from the carrier frequency. Thus, the modulated signal is formed by adding and subtracting modulating frequencies from the carrier signal. The phase shift, or phase discrimination method of single sideband generation employs two balanced modulators. One of the modulators is driven 90° out of phase with the other, so that when the modulated signals are added together, the upper sideband is essentially cancelled out and single sideband modulation, consisting only of the lower sideband, is generated.

PHASE-MEASURING CIRCUIT

FIGS. 15 and 16 related to the use of the invention for phase measuring and should be considered together. A signal generator 60 shown in FIG. 15 supplies a signal of some frequency to output terminal 63. A filter circuit 61 and a load resistor 62 are interconnected between output terminal 63 and ground. A second output terminal 64 is connected to the junction of filter 61 and resistor 62. The signals appearing at the output terminals 63 and 64 will differ slightly in phase due to the reactance of filter 61, but will be of the same frequency.

The phase-measuring configuration illustrated in FIG. 16 utilizes input terminals 65 and 66 connected to output terminals 63 and 64 of FIG. 15. The relative phase relationship of the two signals is shown symbolically at 67 and 68. Clipping and squaring circuits 69 and 70, such as zero-crossing detectors, are connected to input circuits 65 and 66, respectively, to alter the sine waves 67 and 68 to square waveforms illustrated at 71 and 72, respectively. Square wave signal 71 is applied to capacitor 12 while square wave signal 72 is applied to the gates of FETs 14 and 26. The output voltage appearing at 25 will be the DC voltage charged in capacitor 12 from square wave 71, and will be proportional to the phase difference between the impressed signals 67 and 68.

As shown in FIG. 16, the gates of FETs 14 and 26 are connected together and to the line supplying an input signal. One convenient method for accomplishing this connection with the circuit illustrated in FIG. 5 is by moving the movable contact of switch 23 to its A position, and connecting the output from squaring circuit 70 to terminal 13' in FIG. 5. The connection is thus completed to the gates of FETs 14 and 26. Alternatively, flip-flop 1 connected to FET 14 could be driven by the squaring circuit.

Assuming the impressed signals 67 and 68 are exactly in phase, each time FET 14 operates, capacitor 12 receives a full positive charge from waveform 71. This charge is transferred to capacitor 19 through FET 26 and to output 25. However, if the impressed signals 67 and 68 are exactly 180° out of phase, capacitor 12 will charge to a full negative value each time FET 14 is switched on. Thus, the output voltage at 25 will be a full negative voltage. If the signals 67 and 68 are somewhere between 0° and 180° out of phase, signal 71 will be impressed on capacitor 12 during each cycle of operation of FET 14 in such a manner that a portion of the positive waveform of signal 71 and a portion of the negative waveform of signal 71 are impressed upon the capacitor. Thus, the capacitor receives a total average charge somewhere between its maximum positive and its maximum negative values. For example, if the signals are 90° out of phase, one-half the positive portion and one-half the negative portion of each cycle of waveform 71 are impressed upon capacitor 12, and the average voltage supplied to capacitor 12 and transferred to the output is 0.

To avoid "ripple" in the output, it is desirable that the RC time constant of resistor 11 and capacitor 12 be much greater than the signal period. A factor of 100 times or more is suitable for this purpose.

FIGS. 17 and 18 illustrate two modifications of phase meters according to the present invention. In FIG. 17 two signals of identical frequency but of unknown phase relationship are applied to inputs 79 and 80 respectively. These signals are fed through amplifiers 77 and 78 to mixers 81 and 82. A reference signal $f_m$ is applied to both mixers 81 and 82. The output from each mixer is applied to the input of respective clipping and squaring circuits 69 and 70. The output of clipping and squaring circuit 69 is applied through resistor 11 to capacitor 12. The output of clipping and squaring circuit 70 is applied through isolation amplifier 73 to the gate terminals of FETs 14 and 26. One side of capacitor 12 is connected to one terminal of FET 14 and the other side of capacitor 12 is connected to a terminal of FET 26. The opposite terminal of FET 14 is connected to ground, and the opposite terminal of FET 26 is connected to one side of capacitor 19, and to the input of isolation amplifier 74. The opposite side of capacitor 19 is connected to ground, and the output of isolation amplifier 74 is connected to output terminal 106.

In operation, signals of identical frequency are applied to inputs at 79 and 80 and fed through mixer 81 and 82. Clipping and squaring circuits 69 and 70 perform the similar function as clipping and squaring circuits 69 and 70 in the previous embodiment, and the remainder of the circuit and phase detection circuit 105 operates in a manner similar as heretofore described. Mixers 81 and 82 provide a carrier frequency similar to that described so as to shorten the time duration of each cycle of the signal so as to effectively make the signal into the RC network of the phase meter 105 of relatively short time duration. Thus, the RC time constant of resistor 11 and capacitor 12 becomes relatively long in relationship to the time duration of each cycle of the signal to reduce or eliminate ripple at the output.

FIG. 18 illustrates modifications of the circuit in FIG. 17. As shown in FIG. 18, the mixer circuits may be eliminated where the signals being compared for phase difference are of sufficiently high frequency so that the RC time constant of resistor 11 and capacitor 12 is relatively long compared to the time duration of each cycle of input signal. Also, amplifiers 75 and 76 may be conventional amplifiers to enhance weak signals. Isolation amplifiers are not necessary where the mixer is not used, since the purpose of isolation amplifiers is to isolate the input from the mixer signal $f_m$.

TRANSFER FUNCTION ANALYZER

The circuit block and schematic diagram of FIG. 19 illustrates how a transfer function analyzer can be implemented, employing the principles of the present invention. Such an analyzer can be described most generally as a phase and amplitude comparator. A pair of signals having phase and amplitude differences, but of the same frequency, are applied to input terminals 79 and 80. Terminals 79 and 80 are connected to the inputs of amplifiers 77 and 78. The output of amplifier 77 is applied to the input of mixer 81 and to the input of isolation amplifier 76. The output of amplifier 78 is applied to the input of mixer 82 and to the input of isolation amplifier 75. The output of isolation amplifiers 75 and 76 are applied to squaring circuits 69 and 70 and to phase detector 105, identical to phase detector 105 hereinbefore described. The output at terminal 106 is representative of the phase difference between the two signals, the operation of this circuit having been described hereinbefore in connection with FIGS. 16–18.

A mixing signal $f_m$ is applied to the mixers 81 and 82 at terminals 83 and 84, respectively. The output of mixers 81 and 82 are applied through filters 85 and 86 to the input of integrator—filter circuits 87 and 88, respectively. Integrator-filter circuits 87 and 88 are of the type illustrated in FIG. 5 and each preferably includes approximately five capacitor stages. Hence, the notation "5 pole" denotes that there are five capacitor stages in each integrator-filter unit 87 and 88. The signals applied form filter circuits 85 and 86 to the integrator-filter circuits 87 and 88 represent the input $f(t)$ to each integrator-filter.

Oscillator 94 generates an alternation current signal which is applied to the input of Miller sweep generator 95. The Miller sweep sweep generator is a generator of the type which produces a ramp voltage which varies substantially linearly between a minimum and maximum voltage. This signal is applied to voltage controlled oscillator (VCO) 96 and to output terminal 104. VCO 96 provides an oscillation signal having a frequency dependent upon the amplitude of the signal supplied by Miller sweep generator 95. Thus, VCO 96 provides a signal having a frequency which continuously varies between a minimum and maximum during each ramp function of the signal from the sweep generator.

The output of each integrator-filter circuit 87 and 88 is applied through isolation amplifiers 89 and 90 to peak-detecting devices 91 and 92. The peak detector is a circuit which detects the peak or maximum value of an input signal and produces an output voltage having an amplitude representative of the amplitude of the peak of the input signal. The output of peak detector 91 is applied through isolation amplifier 99 to output 103. The output of peak detector 92 is applied through isolation amplifier 98 to output terminal 102. Also, the output from each of peak detectors 91 and 02 is applied to amplitude-squared amplifier 93, whose output is applied through isolation amplifier 97 to output terminal 101. The amplitude-squared amplifier 93 produces an output signal corresponding to 20 log (amplitude of the input).

In the operation of the amplitude comparator portion of the spectrum analyzer illustrated in FIG. 19, VCO 96 produces a varying frequency output signal having a minimum frequency below the frequency of the signal to be analyzed, and a maximum frequency above it. The signal from VCO 96 is applied to integrator-filter circuits 86 and 87 to switch the FETs in the capacitor stages. When the signal from VCO 96 sweeps past the frequency of the signals being analyzed, the integrator filters pass the signals being analyzed to peak detectors 91 and 92. Thus, the integrator filters operate as band-pass filters, passing those signals having a frequency in the range of the switching signal, provided by VCO 96.

Peak detectors 91 and 92 determined the peak of the signal passed by integrator filters 86 and 87 which occurs when the signal from VCO 96 has the same frequency as the signal being analyzed. The voltage magnitude of the signals being analyzed may be determined by measuring the voltage from peak detectors 91 and 92. Furthermore, the frequency of the signals being analyzed may be determined by measuring the voltage from the Miller sweep generator 95 at the time that peak generators 91 or 92 pass a signal. By way of example, if the signal being analyzed is at 10 kc., and the Miller sweep generator produces a ramp voltage to drive VCO 96 form 1 to 100 kc., the peak detector will produce an output when the Miller sweep generator output reaches 1/10 its maximum value (corresponding to 10 kc. output from the VCO).

The amplitude-squared amplifier squares the signals provided by peak detectors 91 and 92 to provide a signal having a voltage of 20 log (amplitude of input) at output terminal 101.

The transfer characteristics of the input signals may be determined by plotting phase and amplitude against frequency. A typical set of characteristics is illustrated in FIG. 20 where amplitude is plotted against frequency in curve (*a*) and phase is plotted against frequency in curve (*b*). To derive the curves illustrated in FIG. 20, terminal 104 may be connected to the *x*-axis of an oscilloscope or oscillograph and either terminal 101 (for curve (*a*)—20 log amplitude v. frequency) or terminal 106 (curve (*b*)phase v. frequency) may be connected to the *y*-axis. The resultant curves will be representative of the transfer function of the signals at input terminals 79 and 80.

SPECTRUM ANALYZER

FIG. 21 illustrates a spectrum analyzer for determining the frequency components of a signal applied at terminal 80 and is substantially identical to the frequency-determining portion of the transfer function analyzer illustrated in FIG. 19. FIG. 21 also illustrates that the number of capacitor stages in integrator filter 120 may be varied as desired by selectively operating switch 111, and the frequency of oscillator 94 may be varied by selective operation of switch 110 to vary the duration of each ramp signal from Miller sweep generator 95.

Like the circuit illustrated in FIG. 19, the circuit illustrated in FIG. 21 detects the peak of the input signal and the peak voltage is supplied to terminal 102. Be determining the voltage from Miller sweep generator 95 at terminal 104 when each peak occurs, the frequency components of the input signal at terminal 80 may be determined, as hereinbefore explained.

SAMPLING INTEGRATOR (FIG. 22)

In FIG. 22 there is illustrated a sampling integrator similar to that illustrated in FIG. 5 comprising a plurality of capacitor stages, 10′, 10″, 10‴, which are described in greater detail in connection with FIG. 5. Gate electrode 15 of each field-effect transistor 14 is connected to a respective flip-flop of ring counter 22 through an amplifier 21 as described in connection with FIG. 5. However, instead of taking the output from lead 18 as in the case of the sampling integrator illustrated in FIG. 5, the output is taken from lead 200 which is connected to source electrodes 17 of the field-effect transistors 14. Also, the output is connected to drain electrode 16 of field-effect transistor 26. Lead 200 is referenced to ground 20 through resistor 201.

The response characteristics of the sampling integrator illustrated in FIG. 22 over a range of frequencies is illustrated in FIG. 23 as waveform 202. A comparison of the response characteristics of the sampling integrator illustrated in FIG. 22 to the response characteristics of the circuit illustrated in FIG. 5 will reveal that the response characteristics of the sampling integrator illustrated in FIG. 22 may be characterized as the inverse to the response characteristics of the sampling integrator illustrated in FIG. 5. The inverse relationship of the sampling integrator illustrated in FIG. 22 results from the fact that the output of the sampling integrator illustrated in FIG. 5 is obtained from the charges across the capacitors 12, whereas in FIG. 22 the charges across the capacitors essentially block the input voltage from reaching the output terminal. Hence, the response characteristic of the sampling integrator illustrated in FIG. 22 is basically inverse to the response characteristic of the sampling integrator illustrated in FIG. 5.

NOTCH FILTER (FIG. 24)

FIG. 24 illustrates a notch filter having a sampling integrator as illustrated in FIG. 5, connected in series with a sampling integrator as illustrated in FIG. 22, the notch filter illustrated in FIG. 24 has characteristics illustrated by waveform 203 illustrated in FIG. 25. Waveform 203 comprises a combination of waveform 57 illustrated in FIG. 7 (which is the response characteristics of the sampling integrator illustrated in FIG. 5) and waveform 202 illustrated in FIG. 23 (which is the response characteristics of the sampling integrator illustrated in FIG. 22.)

It will be appreciated that the embodiment illustrated in FIG. 22 may be used in different combinations, either with other sampling integrators as illustrated in FIG. 22 or with sampling integrators such as illustrated in FIG. 5, to perform functions such as those described in connection with the circuits illustrated in FIGS. 8 through 21, inclusive, It will also be appreciated that although the embodiments illustrated in FIGS. 5 and 22 involve the controlled charging of capacitors in different capacitor stages, circuits may also be provided for obtaining the controlled discharging of capacitors in different capacitor stages without departing from the scope of this invention.

There have been described hereinabove a variety of uses and implementations of a digital sampling integrator-filter circuit of novel configuration which has the great versatility indicated by these implementations thereof. Phase sensitive devices, frequency sensitive devices and various other applications in the frequency and phase domain have been described. It should be abundantly clear to those skilled in the arts to which the invention and its implementations are applicable that other devices can be devised in the light of the teachings above presented within the ambit of the claims which follow.

This invention is not to be limited by the embodiments shown in the drawings and described in the description, which are given by way of example and not of limitations, but only in accordance with the scope of the appended claims.

1. A variable filter, comprising
   a signal terminal pair;
   a resistor;
   an output terminal pair;
   means to connect one end of said resistor to a first terminal of said signal terminal pair;
   means to connect the other end of said resistor to a first terminal of said output terminal pair;
   a capacitor;
   means to connect one end of said capacitor to the first terminal of said output terminal pair;
   bivalued resistance means;
   means to connect one end of said resistance means to the other end of said capacitor;
   means to connect together the second terminals of said signal and output terminal pairs and the other end of said resistance means; and
   means to switch said resistance means between its values.

2. The filter of claim 1 wherein said resistance means comprises a field-effect transistor.

3. The filter of claim 1 wherein said switch means comprises a bistable state circuit.

4. The filter of claim 1 wherein said switch means comprises a flip-flop.

5. The filter of claim 1 in which said switch means operates at a rate equivalent to the frequency of the signal at said signal terminal pair.

6. The filter of claim 1 in which the time constant of the filter is sufficiently high for one value of said resistance means to permit said capacitor to retain charge over a cycle of energization of said signal terminal pair.